United States Patent [19]

Touborg

[11] 4,200,469
[45] Apr. 29, 1980

[54] METHOD OF FIRING A ROTARY KILN AND APPARATUS THEREFOR

[75] Inventor: Jørn Touborg, Copenhagen-Valby, Denmark

[73] Assignee: F. L. Smidth & Co., Cresskill, N.J.

[21] Appl. No.: 897,843

[22] Filed: Apr. 19, 1978

[30] Foreign Application Priority Data

Apr. 19, 1977 [GB] United Kingdom ............... 16174/77

[51] Int. Cl.² ............................................. C04B 7/44
[52] U.S. Cl. .................................................. 106/100
[58] Field of Search ........................................ 106/100

[56] References Cited

U.S. PATENT DOCUMENTS 3,498,594  3/1970  Rikhof ................................. 106/100

*Primary Examiner*—James Poer
*Attorney, Agent, or Firm*—Pennie & Edmonds

[57] ABSTRACT

A method of firing a rotary kiln for the production of cement clinker is disclosed. The method includes the step of directing at least a major portion of the amount of fuel necessary for firing the kiln so as to be brought into direct contact with hot cement clinker in a precooling zone of the rotary kiln. There is further disclosed an apparatus for the production of cement clinker from cement raw meal. The apparatus comprises an inclined rotary kiln having a precooling zone in the lower end portion thereof in which cement raw meal collects and means for directing a jet of fuel into direct contact with hot cement clinker in the precooling zone of the material downstream end of the rotary kiln.

10 Claims, 1 Drawing Figure

U.S. Patent
Apr. 29, 1980
4,200,469
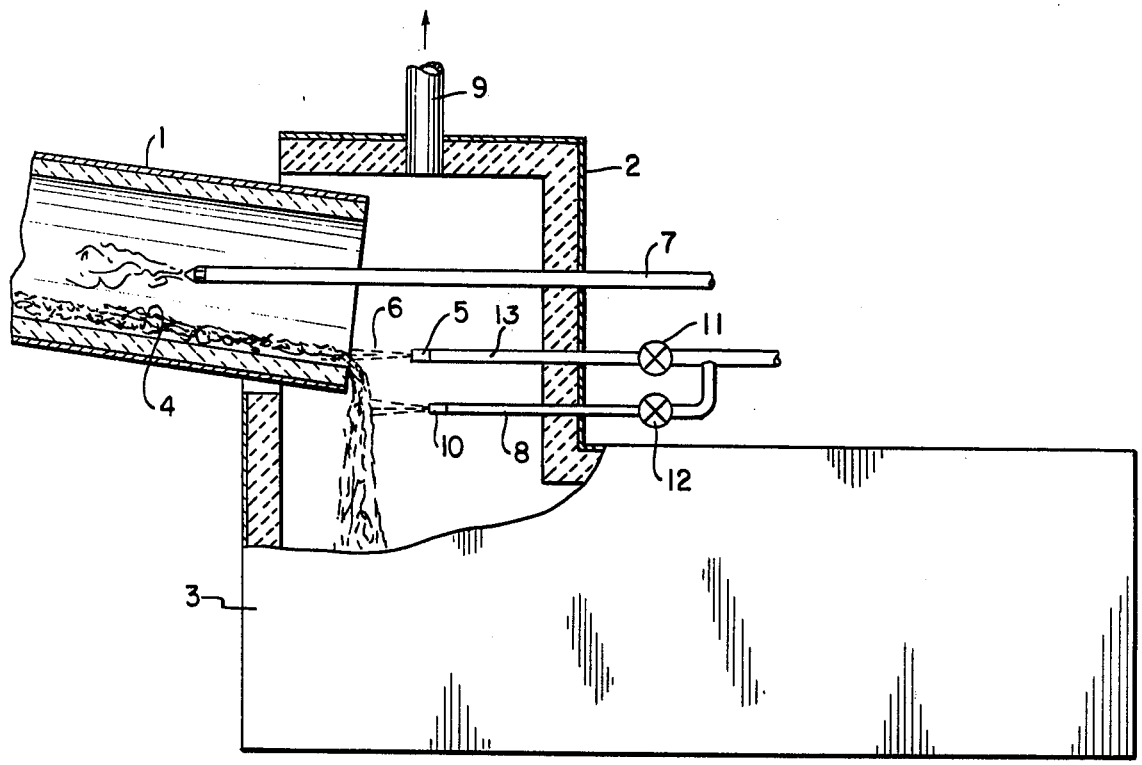

METHOD OF FIRING A ROTARY KILN AND APPARATUS THEREFOR

BACKGROUND OF THE INVENTION

1. Field of the Invention

The invention relates to a rotary kiln and method of firing same for burning cement raw materials and the like.

2. Description of the Prior Art

The thermal energy necessary for the desired burning in a rotary kiln is usually procured by burning a fuel such as gas, oil or powder coal which is conveyed into a kiln through a burner.

The burner atomizes and distributes the fuel so as to bring it into close contact with an amount of air having sufficient oxygen content for nourishing the combustion so that combustion is carried out rapidly and efficiently in a controllable manner. A portion of the air necessary for supporting combustion is introduced through the burner under pressure. This portion of the air, known as the primary air, aids in the atomization and distribution of the fuel in the burning zone. Highly developed technology is necessary to construct a good burner for a rotary kiln for making cement, particularly since such a burner operates under severe conditions of heat and pressure. Such burners are exposed to constant heavy wear due to the large quantities of fuel that they convey and to an extensively dust-laden environment.

The rather complex construction incident to such a burner results in certain disadvantages. For example, functional defects arise easily and frequently result in impaired atomization and/or inadequate air mixing in the injected fuel. Further, the use of primary air, i.e. combustion supporting air fed directly to the burner gives rise to certain disadvantages. The primary air normally constitutes about 15 percent of the total amount of air fed to the burning zone. Unlike secondary air, i.e. air which is fed to the burning zone via alternate routes, other than the burner, the primary air is not preheated by the clinker charge. Accordingly, the increased utilization of primary air significantly decreases the heat economy of the kiln since primary air neither assists in recovering the heat contained in the clinker nor in transferring that heat to the burning zone of the kiln.

Norwegian patent specification No. 125,062 discloses a device for feeding liquid fuel directly into a rotary kiln through one or more tubes inserted radially through the side wall of the kiln. According to the Norwegian disclosure, a tube is provided at its outer end with a scoop device which scoops oil from a reservoir of fluid fuel during a portion of rotation of the rotary kiln and thereafter the oil flows through the tube into the interior of the kiln wherein it is gasified and ignited by the heat of the clinker.

The disclosure of the Norwegian patent does not, however, teach a method relating to the total firing of the kiln, but only to the introduction of oil and air into the kiln along the burning zone in order to prolong and regulate its temperature profile. However, the device according to the Norwegian patent utilizes the feature of locating the inlet device in the high temperature zone of the kiln. Moreover, although the tubes utilized possess greater strength and endurance than a conventional burner, they are nevertheless exposed to excessive wear and severe temperature impacts. Further, additional combustion air is introduced via tubes through the kiln wall thereby depriving the clinker cooler of a corresponding amount of cooling air.

I have invented a method of firing a rotary kiln and a rotary kiln which avoids the disadvantages of the prior art and is effective in improving the efficiency of the clinkering process.

SUMMARY OF THE INVENTION

The invention relates to a method of firing a rotary kiln for the production of hot cement clinker comprising directing at least a major portion of the amount of fuel necessary for firing the kiln so as to be brought into direct contact with the hot cement clinker in the precooling zone of the kiln. According to the invention, the use of primary air is substantially avoided and a burner of a very simple and robust construction, located without the high temperature zone of the kiln is utilized.

This is achieved according to the invention by bringing at least the major part of the amount of fuel (in the form of liquid fuel, preferably oil, or fluidized fuel oil or coal dust) in the form of a jet necessary for firing the rotary kiln into direct contact with the hot or glowing clinker in the precooling zone of the kiln. When the fuel contacts the glowing clinker it becomes heated and evaporates and simultaneously quenches the clinker. This may also have a favorable effect on the quality of the cement produced.

The fuel evaporation takes place entirely without the use of primary air and without using complex burner constructions for mixing oil and air. Further, the heat for the evaporation of the fuel is effectively taken from the precooling zone of the kiln, and not from the air in the high temperature zone. This feature further improves the heat economy of the kiln.

A portion of the amount of fuel necessary for the firing of the kiln may be provided by a conventional burner, particularly upon starting up a kiln in which the clinker has not yet reached the necessary temperature for direct ignition of fuel directed therein. When the clinker has achieved the necessary temperature, the conventional burner may be put out and removed, or it may function as a supplemental heat source. By using the conventional burner only when starting up and/or for handling the combustion of a minor part of the total necessary amount of fuel, it is only exposed to insignificant wear.

The fuel to be brought into direct contact with the glowing clinker may be injected as a jet which is discharged at a high velocity onto the glowing clinker, and is atomized upon impact with the clinker. Besides the mentioned atomization, the jet liquid fuel then penetrates deeply into the clinker which is consequently more homogeneously exposed to the desired quenching. When use is made of a solid jet, i.e. a high velocity jet, the injection nozzle may be located closer to the kiln outlet since the fuel in the solid jet only burns to an insignificant extent in the hot kiln chamber on its way from the nozzle to the glowing clinker. Consequently, the nozzle is exposed to less severe wear.

The use of oil as a fuel directly sprayed on the clinker may advantageously result in a desirable reduction of oxides in the charges.

The air which is taken from the clinker cooler to a precalciner in which a precalcination of the raw materials being fed to the kiln takes place, may be too cold during the start up of the precalciner for igniting the fuel fed thereto. To accommodate such circumstances, a portion of the fuel injected into the kiln may further be brought into direct contact with the clinker in the transition region between the kiln and a cooler. In this manner, combustion takes place at this transition region which can contribute to further heating of the air for the calciner.

The invention also relates to a rotary kiln for the production of cement clinker to practice the inventive method. The kiln is inclined and has a precooling zone in the lower end portion thereof in which cement clinker collects. The kiln is provided with a nozzle connected to a source of liquid fuel such as oil, or fluidized oil or coal under pressure and arranged to direct a solid jet of the fuel into direct contact with glowing clinker while it is in the precooling zone at the material downstream end of the kiln.

As a direct result of the inventive method, improvements in energy efficiency, particularly in the form of heat economy, are achieved, in addition to the constructional advantages already discussed. This is primarily due to the increased efficiency of the cooler resulting from the increased amount of cooling air which has to be conveyed through the cooler as a substitute for the abrogated primary air in order to nourish the combustion in the rotary kiln. According to the inventive method, a greater portion of the heat contained in the clinker is returned to the burning zone of the kiln instead of being lost, as was usually the case.

Secondly, an energy economy, though smaller, is obtained in that the heat for the gasification of the fuel is taken from the clinker which it is desirable to cool. This is in contrast to the usual method wherein the heat for the gasification is taken from a burning zone, which, however, it is desirable to heat as much as possible.

Finally, the quenching of the clinker caused by the spraying on of fuel may have a favorable influence on the strength qualities of the finished product.

BRIEF DESCRIPTION OF THE DRAWINGS

Preferred embodiments of the invention are described hereinbelow with reference to the sole drawing which illustrates diagramatically, the firing end of a rotary kiln and the transition between the rotary kiln and a clinker cooler of the grate type.

DETAILED DESCRIPTION OF THE PREFERRED EMBODIMENTS

As illustrated in the drawing, a rotary kiln 1 is connected to a grate type clinker cooler 3 by a cooling shaft 2 which projects from the clinker cooler 3. The cooling shaft 2 is provided with a tube 9 which, as illustrated, is conveniently disposed in the upper portion of the cooling shaft 2 for conveying preheated cooling air to a remote calciner (not shown).

Raw materials such as cement clinker 4 collect in the lower end portion of the inclined rotary kiln 1. The clinker 4 is heated to sintering temperatures by burning oil. The oil is conveyed through a conduit such as pipe 13 having nozzle 5 located at the forward end thereof adjacent the rotary kiln so that the oil is sprayed directly onto the glowing clinker 4 which ignites the oil.

Conventional burner 7 is mounted in the cooling shaft 2 and extends therethrough. Conventional burner 7 is used during the start up operation as well as to provide supplemental heating, as necessary, and is designed to burn any suitable fuel. The conventional burner 7 may be constructed in such manner that it can be removed after start up so as to permit firing exclusively by direct injection of oil.

In the drawing, the oil is being injected substantially axially as a solid jet which contacts the glowing clinker 4 at an acute angle. The nozzle 5 is adjustable with respect to its proximity to the rotary kiln 1 and, further, it may be adjustable in relation to pipe 13 so as to vary the angle between the jet of oil and the clinker 4, especially at low velocities. Upon contacting the glowing clinker 4, the oil becomes gasified and the resultant gas mixes with the ambient air. The gasified oil and air mixture is conveyed into the rotary kiln 1 at least partially by way of clinker cooler 3.

Accordingly, combustion of the gas/air mixture takes place immediately after the oil is injected onto the glowing clinker in a region adjacent thereto. When the jet of oil 6 is injected at a high velocity, atomization of the oil simultaneously accompanies gasification of the oil thereby rendering gasification in the hot kiln chamber easier. Injection under high pressure provides a further advantage that the jet of oil 6 penetrates deeply within the rotary kiln 1 into the glowing clinker 4 so that the heat necessary for gasification of the oil is removed almost exclusively from the clinker charge rather than from the kiln smoke. This is another advantageous feature since it is desirable to maintain the kiln smoke as hot as possible.

Where it is desired that the clinker cooler 3 also provide preheated air to a precalciner (not shown), the air may be conveyed to the precalciner through the duct 9; however, the air conveyed through duct 9 may be too cold for igniting the fuel in the precalciner, especially during start up operation of the kiln during which time the kiln is not delivering sufficiently hot clinker. In such circumstances it is desirable to heat the air which passes through the clinker cooler 3, for example, by firing in the transition zone or the cooling shaft 2 disposed between the rotary kiln 1 and the clinker cooler 3. Such firing may be advantageously accomplished by providing the supply pipe 13 with a branch pipe 8 having a nozzle 10 at the end thereof, through which a portion of the liquid fuel is sprayed on the clinker while it is in the transition region between the kiln 1 and the cooler 3. The oil supply pipe 13 and the branch pipe 8 are equipped with regulators 11 and 12, respectively, to permit independent regulation of oil supplied to the nozzles 5 and 10, respectively.

Although in the above description, the fuel utilized has been oil, other fuel (including fluidized fuel) such as coal dust may be used without deviating from the scope of the invention. Similarly, although the drawing indicates a clinker cooler of the grate type, the invention may be used in connection with a rotary kiln having other cooler types such as, for example, planetary coolers.

I claim:

1. A method of firing a rotary kiln for the production of hot cement clinker, comprising:
    directing at least a major portion of the amount of fuel necessary for firing the kiln so as to be brought into direct contact with the hot cement clinker in the precooling zone of the kiln.

2. The method according to claim 1 wherein said fuel brought into direct contact with the hot cement clinker is in the form of a jet comprising at least one of liquid fuel and fluidized fuel such as oil or fluidized coal dust.

3. The method according to claim 2 wherein said liquid fuel is oil.

4. A method of firing an inclined rotary kiln for the production of cement clinker from cement raw meal, wherein said rotary kiln has a precooling zone at the lower end portion thereof immediately upstream of the material outlet end portion thereof, and hot cement clinker in the precooling zone, comprising:
 directing at least a major portion of the amount of fuel in the form of at least one of liquid fuel oil and fluidized coal dust necessary for firing the kiln so as to be brought into direct contact with the hot cement clinker in the precooling zone of the rotary kiln so as to cause said fuel to evaporate upon contacting the hot cement clinker; and
 simultaneously at least partially quenching said hot cement clinker by said fuel.

5. The method according to claim 4 wherein a minor portion of the amount of fuel necessary for firing the kiln is provided by a burner.

6. The method according to claim 5 in which the jet fuel is injected at a relatively high velocity so as to achieve relatively deep penetration of the fuel into the rotary kiln.

7. The method according to claim 6 wherein the high velocity jet of fuel is at least substantially atomized upon impacting the clinker.

8. The method according to any of claims 4-7 wherein a clinker cooler is positioned to receive hot cement clinker from the kiln, and a minor portion of the fuel necessary for firing the kiln is brought into contact with the hot cement clinker in the transition region between the rotary kiln and the clinker cooler.

9. A method of firing an inclined rotary kiln for the production of cement clinker from cement raw meal wherein said rotary kiln has a burner disposed within the kiln proper, a precooling zone located at the lower end portion thereof spaced immediately upstream of the material outlet end thereof, and hot cement clinker in the precooling zone, comprising directing at least a major portion of the amount of fuel in the form of at least one of liquid fuel oil and fluidized coal dust necessary for firing the kiln so as to be brought into direct contact with the hot cement clinker in the precooling zone of the kiln at least at a location spaced upstream of the material outlet of the kiln and downstream of the kiln burner so as to cause said fuel to evaporate upon contacting the hot cement clinker and to simultaneously cause at least partial quenching of the hot cement clinker.

10. A method of firing an inclined rotary kiln for the production of cement clinker from cement raw meal wherein said rotary kiln has a burner disposed within the kiln proper, a precooling zone located at the lower end portion thereof spaced immediately upstream of the material outlet end thereof, and hot cement clinker in the precooling zone, comprising injecting at least a major portion of the amount of fuel in the form of liquid fuel oil necessary for firing of the kiln from a nozzle spaced from the burning zone of the kiln and at sufficient velocity so as to be brought into direct contact with the hot cement clinker in the precooling zone of the kiln at least at a location spaced upstream of the material outlet of the kiln and downstream of the kiln burner and to penetrate hot cement clinker in the precooling zone of the kiln so as to cause said fuel to evaporate upon contacting the hot cement clinker and to simultaneously cause at least partial quenching of the hot cement clinker.

* * * * *